US008059864B2

(12) United States Patent
Huang et al.

(10) Patent No.: US 8,059,864 B2
(45) Date of Patent: Nov. 15, 2011

(54) SYSTEM AND METHOD OF IMAGE-BASED SPACE DETECTION

(75) Inventors: Ching-Chun Huang, Taichung (TW); Yao-Jen Chang, Taipei (TW); Ruei-Cheng Wu, Kaohsiung (TW); Cheng-Peng Kuan, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 870 days.

(21) Appl. No.: 12/111,190

(22) Filed: Apr. 28, 2008

(65) Prior Publication Data

US 2009/0085772 A1   Apr. 2, 2009

(30) Foreign Application Priority Data

Sep. 28, 2007   (TW) ................................ 96136320 A

(51) Int. Cl.
 *G06K 9/00*   (2006.01)
(52) U.S. Cl. ........ 382/103; 382/104; 382/105; 340/933; 700/1
(58) Field of Classification Search .......... 382/103–105; 340/932.2, 933, 937; 701/1
See application file for complete search history.

(56) References Cited

U.S. PATENT DOCUMENTS

| | | | |
|---|---|---|---|
| 2,644,150 A | 6/1953 | Burn | 340/932.2 |
| 5,004,997 A | 4/1991 | Shisgal et al. | 340/436 |
| 5,029,094 A | 7/1991 | Wong | 364/467 |
| 5,091,727 A | 2/1992 | Mahmood | 340/932.2 |
| 5,291,563 A | 3/1994 | Maeda | 382/48 |
| 5,432,508 A | 7/1995 | Jackson | 340/932.2 |
| 5,504,314 A | 4/1996 | Farmont | 235/384 |
| 5,966,345 A | 10/1999 | Dee et al. | 368/90 |
| 6,107,942 A | 8/2000 | Yoo et al. | 340/932.2 |
| 6,650,250 B2 | 11/2003 | Muraki | 340/932.2 |
| 6,694,259 B2 | 2/2004 | Curbow et al. | 701/213 |
| 6,865,539 B1 | 3/2005 | Pugliese, III | 705/5 |
| 6,885,311 B2 * | 4/2005 | Howard et al. | 340/932.2 |
| 6,885,312 B1 | 4/2005 | Kirkpatrick | 340/932.2 |
| 6,917,307 B2 | 7/2005 | Li | 340/932.2 |
| 6,927,700 B1 | 8/2005 | Quinn | 340/932.2 |
| 2003/0144890 A1 | 7/2003 | Dan | 705/5 |

OTHER PUBLICATIONS

A Bayesian Hierarchical Detection Framework for Parking Space Detection, Ching-Chun Huang et al., 2008 IEEE, p. 2097~p. 2100.
Qi Wu and Yi Zhang "Parking Lots Space Detection" School of Computer Science, Carnegie-Mellon University, Machine Learning; 10-701/15-781, Fall 2006.
Kyoung-Ho Choi, Sungkwan Joo, Seong Ik Cho, and Jong-Hyun Park "Locating Intersections for Autonomous Vehicles: A Bayesian Network Approach" ETRI Journal, vol. 29, No. 2, Apr. 2007, pp. 249-251.

(Continued)

*Primary Examiner* — Wesley Tucker

(57) ABSTRACT

Disclosed is a system and method of image-based space detection. The system includes an image selection module, a 3-layer detection mechanism and an optimization module. At least one image processing area that may affect space-status judgment is selected from plural image processing areas. The 3-layer detection mechanism having an observation layer, a labeling layer, and a semantic layer observes the information about the selected image processing area, associates with a local classification model, and adjacent local constraint model and a global semantics model to completely describe the probability distribution of the links among the three layers, and provide global label constraint information. The optimization module analyzes the probability distribution and global label constraint information, and generates an image-based optimized space detection result.

24 Claims, 12 Drawing Sheets

OTHER PUBLICATIONS

Sheng-Fuu Lin, Yung-Yao Chen, and Sung-Chieh Liu " A Vision-Based Parking Lot Management System" IEEE International Conference on Systems, Man, and Cybernetics, pp. 2897-2902, Oct. 8-11, 2006, Taipei, Taiwan.

Hongeng, S.; Bremond, F.; Nevatia, R. "Bayesian framework for video surveillance application" Pattern Recognition, 2000. Proceedings. 15th International Conference on, vol. 1, Sep. 3-7, 2000, pp. 164-170.

\* cited by examiner

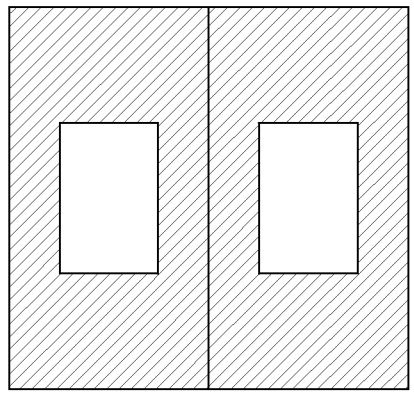
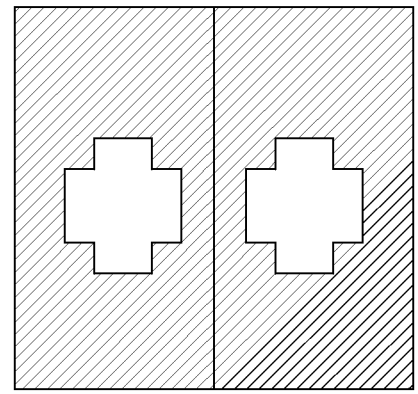
FIG. 11(a)  FIG. 11(b)
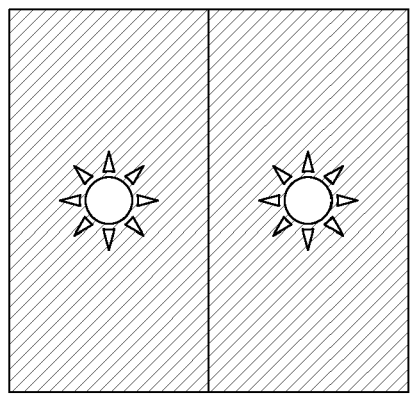
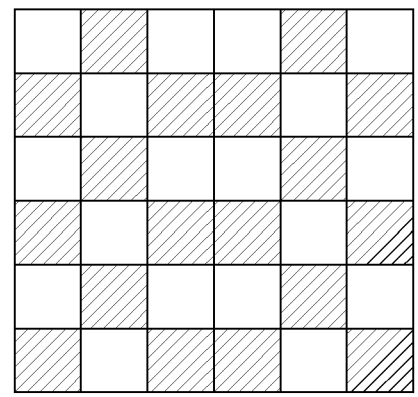
FIG. 11(c)  FIG. 11(d)

SYSTEM AND METHOD OF IMAGE-BASED SPACE DETECTION

FIELD OF THE INVENTION

The present invention generally relates to a system and method of space detection, and more specifically to a system and method of image-based space detection.

BACKGROUND OF THE INVENTION

Intelligent video surveillance technology is widely used. By placing a plurality of cooperative cameras and using image processing, this technology may be used for space detection in a large area, such as parking space detection.

The parking space management usually relies on manual registration, using mechanical bar at the entrance, or installing sensor at each parking space to register the space status. Although the parking management has a simple structure, to find a parking space in a large outdoor parking lot, such as shopping mall, stadium, theater and office building, still takes a lot of time. The registration at the entrance may only provide the number of available parking spaces instead of the exact location of the available space. It is not only inefficient, but also fails to provide other valuable service functions, such as surveillance, guided parking, and so on.

The use of sensors, such as infrared, supersonic, electromagnetic, at each parking space requires the installation of the sensor, which may be prohibitively expensive for a large parking lot. In addition, the maintenance is costly, and may also be affected by the temperature, humidity or other climatic factors. This type of parking space management provides no further safety integrated services, such as guided parking, car surveillance, car theft prevention, bumping tracking, and so on.

The parking management technology is usually classified as sensing-based parking management detection technology or mechanical control based parking management detection technology. The sensing-based technology uses a sensor, such as parking card sensor, infrared sensor, supersonic sensor or electromagnetic sensor. The operation theory is to use a microwave transmitter to transmit microwave (infrared/supersonic) to detect whether a parking space has any large object responding to the microwave, such as blocking or reflecting the microwave. A receiver determines whether a corresponding signal is received to detect the presence of a vehicle. As the sensor may only detect a limited area, each parking space must have its own detection unit. Hence, the high set-up cost, complex hardware wire and difficult maintenance all contribute to the unpopularity of this technology.

Mechanical control based technology uses mechanical facility, such as raising bar, to control and record the number of the cars entering and leaving, and the number of the parking spaces. However, a mechanical bar at the entrance only counts the number of the cars inside the parking lot to get a rough estimation of the available space, but is unable to detect the status of individual parking space and finding the exact location of the available parking space. Hence, finding available parking space may take much time. To alleviate the above problem, a mechanical bar may be installed at each parking space; however, this again involves a high set-up cost. This solution may only be suitable for small parking lots.

U.S. Pat. No. 6,694,259 disclosed a system and method for delivering parking information to motorists. An exemplary embodiment is to use image analysis to find available parking space. By comparing the grey-level values of the image taken by the camera with an unoccupied parking space model, the system may detect whether the parking space is unoccupied. However, the disadvantage is that the precision of this method may be affected by the light and the climate change, or by the camera angle and the shielding of nearby cars.

U.S. Patent Application No. 2003/0144890 disclosed a parking management system and method, where the system user may reserve or bid on a parking space, or join a loyalty program to use the parking management system. An exemplary embodiment of this patent application is to encode all the pixels of an image of a single parking space taken by a camera into a feature vector, and then divide as unoccupied or occupied status to realize the space detection. This method has the disadvantage that the pixel coding can be affected by the light change or noise interference. Another exemplary embodiment uses the detection of the presence of license plate in a parking space as the basis for determining whether the space is occupied or unoccupied. This embodiment also has the disadvantage of the camera angle, the possible incompleteness of a license plate image and the shielding by nearby cars.

SUMMARY OF THE INVENTION

In an exemplary embodiment of the present invention, the disclosed is directed to an image-based space detection system, comprising an image selecting module for obtaining a plurality of image processing areas, and selecting at least an image area affecting the determination of space status; a 3-layer detection mechanism, with an observation layer, a labeling layer and a semantics layer, for observing the information of the selected image area, and integrating a local classification model, an adjacent local constraint model, and a global semantics model to completely describe the probability distribution of the links between the observation layer, the labeling layer and the semantics layer and providing a global label constraint information, and an optimized model for analyzing the probability distribution and the global label constraint to generate the image-based optimized space detection result.

In another exemplary embodiment, the disclosed is directed to an image-based space detection method, comprising: obtaining a plurality of image processing areas and selecting at least one image processing area able to affect the space state determination; constructing a 3-layer detection mechanism for observing the information of the selected image processing area, and integrating a local classification model, an adjacent local constraint model and a global semantics model to fully describe the probability distribution of the linkage between the layers and provide a global label constraint information; and analyzing the probability distribution and the global label constraint information to generate the image-based optimized space detection result.

Yet in another exemplary embodiment, the disclosed is directed to an image-based space detection method. Each space is installed a corresponding device or mark. The method may comprise: capturing a plurality of image processing areas and selecting at least a suitable image processing area from the captured images, training a space identification mark distinguisher; and using the space identification mark distinguisher on the selected image processing area to classify the space status and generate the image-based optimal space detection result.

Yet in another exemplary embodiment, the disclosed is directed to an image-based detection system. Each space is installed with a corresponding device or mark. The system may comprises an image selecting module for capturing a plurality of image processing areas and selecting at least an image processing area from the captured images, and a space identification mark distinguisher for classifying the space status of the selected image processing area and generating the image-based optimized space detection result.

In the aforementioned embodiments, the local classification model, adjacent local constraint model, global semantics model may be pre-trained models. The 3-layer detection mechanism combines the three models to completely describe the relation between layers. Based on the distribution probability of the layer links, through the inference of the optimization module, the optimal space detection result may be generated.

The foregoing and other features, aspects and advantages of the present invention will become better understood from a careful reading of a detailed description provided herein below with appropriate reference to the accompanying drawings.

BRIEF DESCRIPTION OF THE DRAWINGS

FIGS. 11A-11D show an exemplary schematic view of a plurality of special devices or types of labeling, consistent with certain disclosed embodiments of the present invention.

DETAILED DESCRIPTION OF THE PREFERRED EMBODIMENTS

Figure 1:
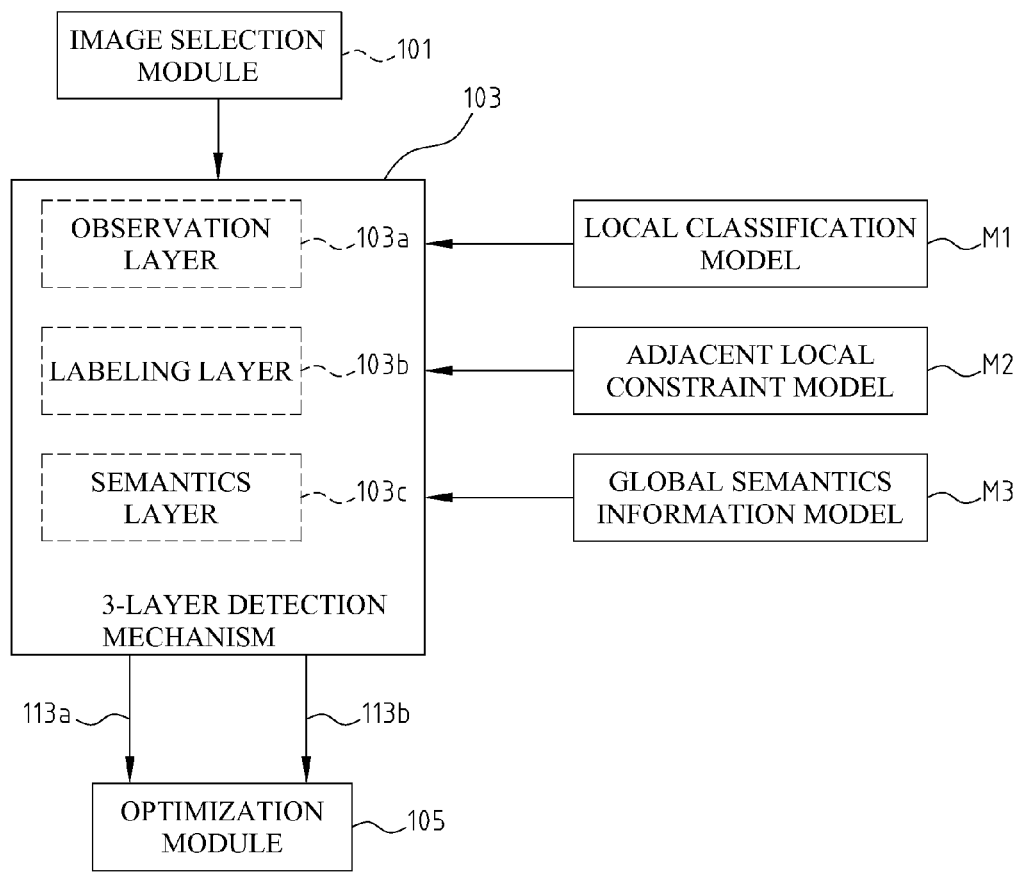
FIG. 1 shows a schematic view of an exemplary image-based space detection system, consistent with certain disclosed embodiments of the present invention.

FIG. 1 shows a schematic view of an exemplary image-based space detection system, consistent with certain disclosed embodiments of the present invention. Referring to FIG. 1, the exemplary image-based space detection system may comprise an image selecting module 101, a 3-layer detection mechanism 103, with an observation layer 103a, a labeling layer 103b and a semantics layer 103c, and an optimization 105. 3-layer mechanism 103 is coupled to image selecting module 101. Optimization module 105 is connected to 3-layer detection mechanism 103.

Image selecting module 101 obtains a plurality of image processing areas, and selects at least an image processing area affecting the determination of space status, for example, the parking space occupying the image processing area. 3-layer detection mechanism 103 observes the information of the selected image processing area, and integrates a local classification mode M1, an adjacent local constraint model M2, and a global semantics model M3 to completely describe probability distribution 113a of the links between observation layer 103a, labeling layer 103b and semantics layer 103c, and provides a global label constraint information 113b. Local classification mode M1, adjacent local constraint model M2, and global semantics model M3 may be pre-trained models or online updated models based on the pre-trained models and the consequential detection result. Optimization module 105 analyzes probability distribution 113a and global label constraint information 113b, and generates the image-based optimal space detection result.

3-layer detection mechanism 103 integrates the observed information and models M1-M3 to the 3-layer detection architecture, so that the relation between observation layer 103a, labeling layer 103b and semantics layer 103c may be completely described, and the probability distribution of the layer link may be used to represent the features and relation between the image processing areas.

After models M1-M3 are integrated to the 3-layer detection architecture of 3-layer detection mechanism 103, local classification model M1 may classify the observed local information into different type of labels. Adjacent local constraint model M2 may constrain the labeling decision between adjacent pixels and the propagation of the adjacent information. Global semantic constraint model M3 may provide the global labeling constrain information, such as implicit 3-D projection information, predictable occlusion information, and so on.

The information included in 3-layer detection mechanism 103, such as probability distribution 113a between layer links and labeling constrain information 113b, after the inference and analysis of optimization module 105, may generate image-based optimal space detection result. Take parking space detection as an example. The image-based optimal space detection result may be the location and number of the vacant spaces, or the classification labeling for each image pixel, such as occupied pixel, vacant pixel, and others. All the vacant spaces may be with or without man-made marks, or some are with marks, and some are without marks.

Figure 2:
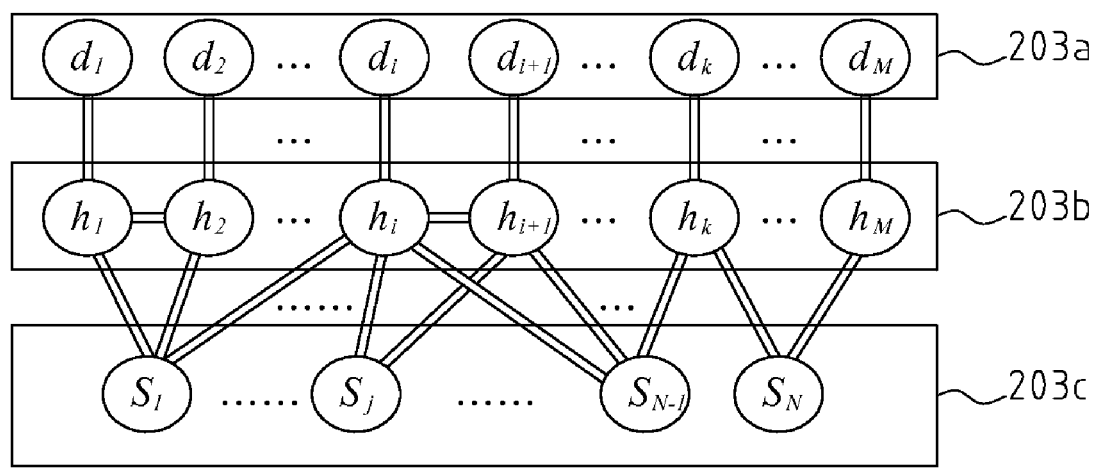
FIG. 2 shows a schematic view of the structure of an exemplary 3-layer detection mechanism, consistent with certain disclosed embodiments of the present invention.

Through the aforementioned pre-trained models M1-M3, or online updated models M1-M3 based on pre-trained initial models and updated according to detection results, the link relation between the layers of 3-layer detection mechanism 103 may be described with an exemplary structure of FIG. 2. As shown in FIG. 2, the observation layer of 3-layer detection mechanism 103 may be an image observation layer 203a, the labeling layer may be a hidden labeling layer 203b, and the semantics layer may be an object semantics layer 203c.

In image observation layer 203a, each of nodes $d_1$-$d_M$ may represent a local feature of an area. The types of features may be diverse, such as, features computed from local information, e.g., census feature, or the color information of each pixel. In hidden labeling layer 203b, each of nodes $h_1$-$h_M$ may represent a classification labeling status of a local area or an image pixel, in other words, representing the labeling classification status of each node in observation layer 203a. In object semantics layer 203c, each of nodes $S_1$-$S_N$ may include all the assumption statuses inferred by the space detection system.

In the exemplary structure of FIG. 2, the message propagation between layers and within a layer must be defined and described. Assume that when assigning the node status of hidden labeling layer 203b, nodes $d_1$-$d_M$ of image observation layer 203a are independent; i.e., no links between nodes $d_1$-$d_M$. However, a link between image observation layer 203a and hidden labeling layer 203b is still needed. In hidden observation layer 203b, each of nodes $h_1$-$h_M$ may represent a local decision according to local feature observation, for example, each of nodes $h_1$-$h_M$ may link nodes in image observation layer and corresponding observation nodes through a graphical connection line. A link between hidden labeling layer 203b and object semantics layer 203c is also needed. In object semantics layer 203c, each of nodes $S_1$-$S_N$ may connect to the related nodes in hidden labeling layer 203b through a graphical connection line.

Figure 3:
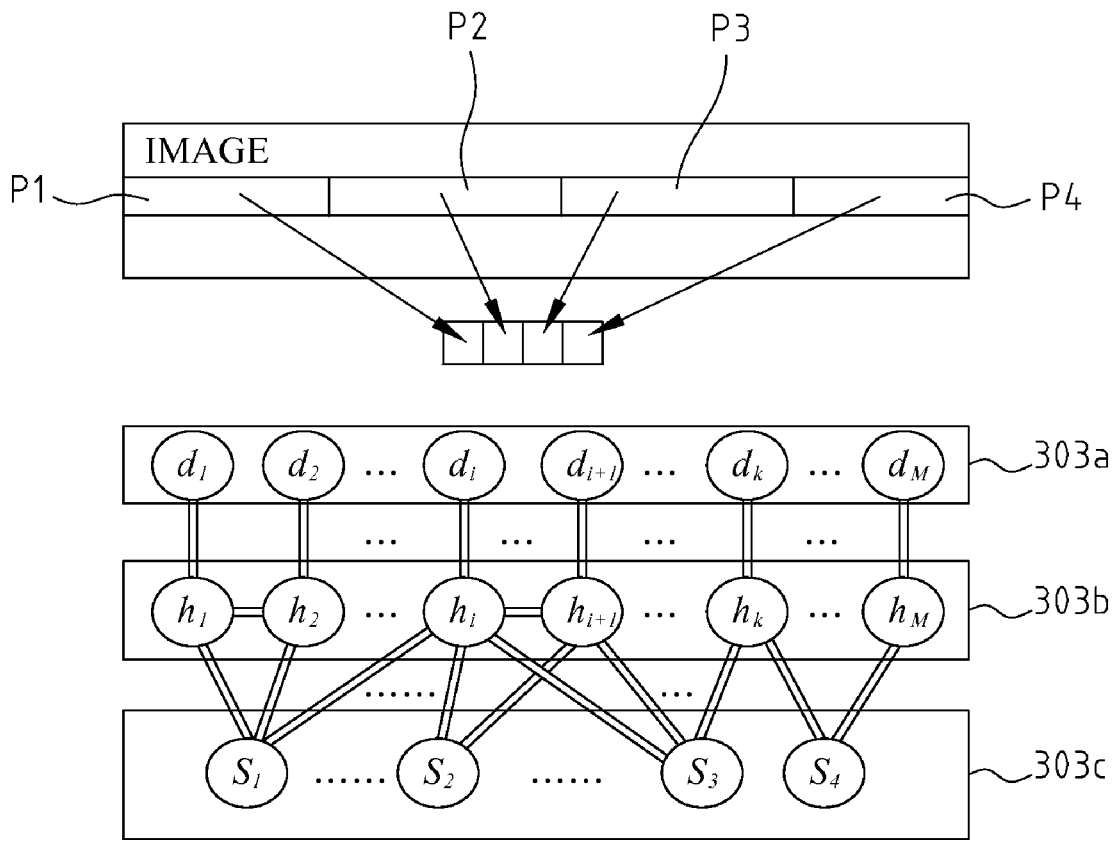
FIG. 3 shows an exemplary schematic view of the link relation between layers in the 3-layer detection mechanism in space detection of a parking lot, consistent with certain disclosed embodiments of the present invention.

FIG. 3 shows an exemplary schematic view of the link relation between layers of the 3-layer detection mechanism for space detection in a parking lot with four parking spaces P1-P4. Referring to FIG. 3, P1-P4 represent four parking spaces of the image processing area. Image observation layer 303a and hidden labeling layer 303b have M nodes $d_1$-$d_M$ and $h_1$-$h_M$, respectively. M is the number of total pixels in the current image processing area. Nodes $S_1$-$S_4$ represent the four nodes in object semantics layer 303c, and 4 is the total number of the parking spaces in the current image processing area.

Through the link relation between layers of the 3-layer detection mechanism, the space detection in the parking lot may be analyzed systematically, the image processing area of the parking lot may be analyzed from the local pixel level to the global space level, and the space status of multiple parking spaces may be determined. This solves the external light change problem and the predictable and unpredictable occlusion problem in a parking lot, for example, the occlusion between neighboring cars and occlusion caused by tree leaves.

Figure 4:
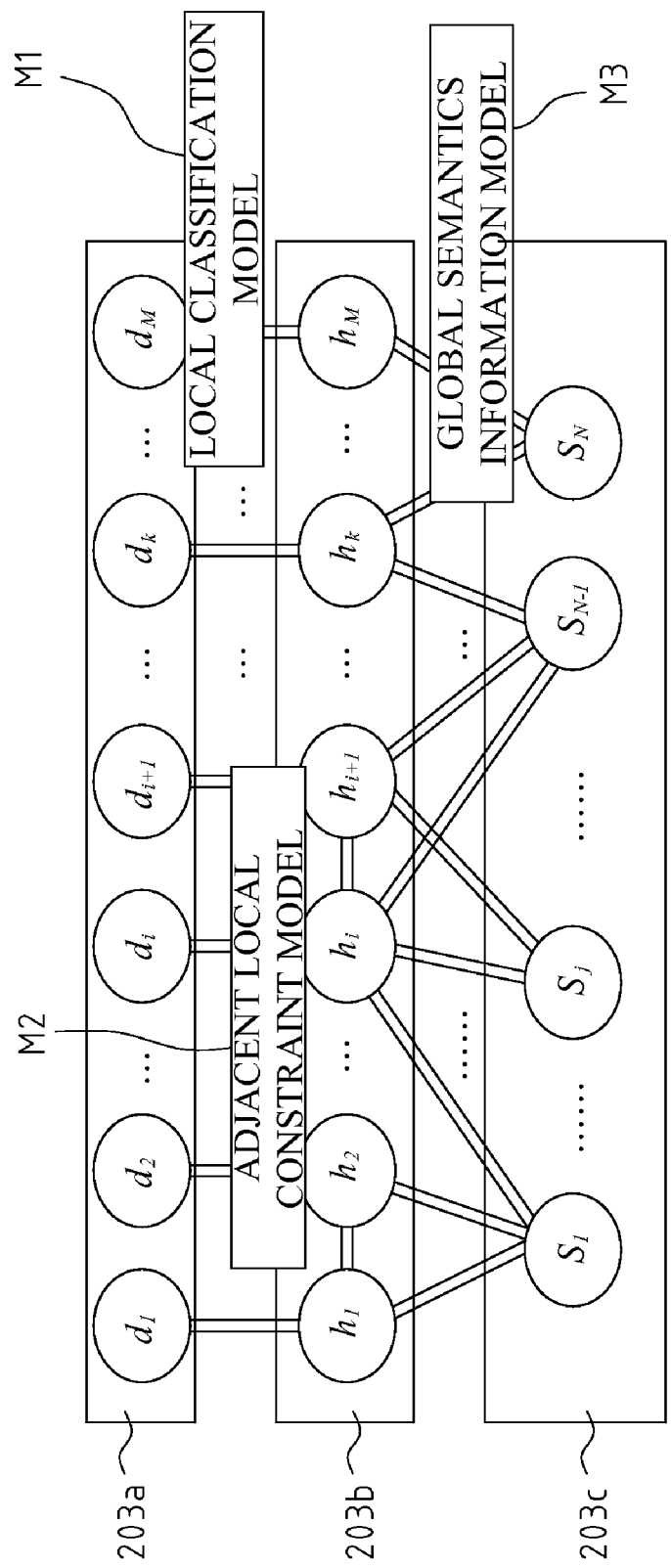
FIG. 4 shows how to establish the link relation between layers in the 3-layer detection mechanism through three pre-trained models M1-M3, consistent with certain disclosed embodiments of the present invention.

Take the detection of parking spaces as an example for explanation, FIG. 4 shows how to establish the link relation between layers in the 3-layer detection mechanism through three pre-trained models M1-M3, consistent with certain disclosed embodiments of the present invention. M1-M3 may also be online updated models based on pre-trained initial models and updated according to the detection result.

Referring to FIG. 4, the link relation between image observation layer 203a and hidden labeling layer 203b may be established through pre-trained local classification model M1. For example, the external light change problem may be processed by the classification process from the image processing layer to the hidden labeling layer. The classification process may also be viewed as an image labeling problem. The classification process may adapt to the external light change through training classification model. In other words, the classification model M1 may adapt to the external light change through lots of lighting-variant training data. This leads the image observation feature caused by light change to be transformed to relatively stable labeling information through the classification process. The external light change is an uncertainty factor affecting the space detection in a parking lot. Therefore, the 3-layer detection mechanism may handle the light change problem in the low-level image classification process.

In hidden labeling layer 203b, the link relation between layers may also be established through pre-trained adjacent local constraint model M2. In hidden labeling layer 203b, nodes are highly related. The highly related characteristic, for example, may use the four-neighbor MRF system to link the neighboring labeling nodes to describe the link relation. Usually, the neighboring pixels tend to the same labeling because of the high related relation. However, if the neighboring pixels are located at the boundary of the parking space, the pixels will display different relation and tend to different types of labeling; therefore, with a different statistic pattern. These statistic characteristics between neighboring pixels are then different from place to place. The adjacent local constraint model M2 is trained to model these properties.

The link relation between hidden labeling layer 203b and object semantics layer 203c may be established through pre-trained global semantics model M3. For example, to describe the relation between the labeling layer and the semantics layer, each node in hidden labeling layer 203b may link to related node in object semantics layer 203c through at least a graphical connection line. Through such links, the global geometric constraint information of object semantics layer 203c may influence the classification status of each local labeling node.

Take the processing of occlusion problem as an example for explanation. The pattern topology of the graphical link between hidden labeling layer 203b and object semantics layer 203c may accurately describe the predictable occlusion pattern information so that the predictable occlusion may become a part of the global semantics constraint. In the process of semantics analysis, this global constraint will be continuously influencing the optimization inference. Therefore, the predictable occlusion factor may also be considered continuously during the optimization inference process. The global semantics constraint information means "the expectation of the node labeling configuration of the hidden labeling layer given a setup in the object semantics layer". In the space detection of the parking lot example, the global semantics constraint may be viewed as "when the status of all the parking spaces are known (i.e., known to the object semantics layer), the possible labeling constraint on each node in hidden labeling layer 203b (i.e., prediction or expectation on hidden labeling layer)".

Because the calibration parameters of the parking lot cameras may be obtained during environmental installation, the three-dimensional information of the parking space may be pre-defined to be effectively described as global semantics constraint information, and viewed as a prior training knowledge which is involved in pre-trained global semantics model M3. The training knowledge completely describes the possible patterns of the predictable occlusion and solves the predictable occlusion problem.

On the other hand, to prevent the incorrect inference caused by unpredictable occlusion, in the optimization inference process, the hypothesis of each inference must satisfy the global semantics constraint so that the local incorrect labeling caused by the unpredictable occlusion will be corrected because of the conflict with the global inference. Under the architecture of the 3-layer detection mechanism, the semantics analysis process and the image labeling process are mutually dependent. The image labeling process may obtain the semantics constraint information through the semantics layer to perform the labeling process having the global supervising features, i.e., to decide the optimal labeling in the hidden labeling layer. The semantics layer 203c may perform the globally consistent semantics inference according to the labeling information of hidden labeling layer 203c, i.e., to decide the optimal status of each space in the semantic layer.

The following describes the training process of the three models M1-M3. Please also refer to FIG. 4.

(1) Local classification model M1 is used for classifying the image processing area information into different types of labeling. Take the space detection in a parking lot as an example. $d_1$-$d_M$ may represent the RGB color feature of the i-th pixel in the image processing area, where M is the number of the pixels in the current image processing area. In hidden labeling layer 203b, each labeling node hi of labeling nodes $h_1$-$h_M$ may represent the classification status of the i-th pixel in the image processing area. For example, any labeling node of labeling nodes $h_1$-$h_M$ in hidden labeling layer 203b may represent classification labeling "C" for car-pixel, or "G" for ground-pixel, or "O" for others.

The trained local classification model M1 may be used to adapt to the external light change. To overcome the light change problem, different classification models may be trained according to different light change situations. Take the space detection in a parking lot as an example. Because the camera locations in the parking lot are fixed, it is possible to pre-define some areas in an image scene. The first order statistics, such as average, and second order statistics, such as variance, of these areas under different light conditions may also be pre-computed and stored. When analyzing an image area occupied by a parking space, through the above statistics, it is possible to determine which light condition classification model is most suitable for the current image area occupied by a parking space, and then the classification model is used to describe the probability distribution $p(d_i|h_i)$ of each pixel belonging to each classification labeling. This probability distribution may be obtained by training the collected training pixels under this specific light condition.

Probability distribution $p(d_i|h_i)$ of local classification of each pixel may be obtained by the pre-training process. Assume that each pixel of an image uses the same classification model, the subscription i in $p(d_i|h_i)$ representing different pixel may be omitted from the following description.

To train the probability distribution $p(d|h=G)$ of the "ground" color model and the probability distribution $p(d|h=O)$ of the "other" color model, a non-parameter based kernel density method may be used to estimate the different types of probability distribution models. The following equation is the probability distribution model estimated by the kernel density method:

$$p(d \mid h = G) = \frac{1}{N_G} \sum_{i=1}^{T_n} \varphi(d - d_{Gi}) \qquad (1A)$$

$$p(d \mid h = O) = \frac{1}{N_O} \sum_{i=1}^{T_m} \varphi(d - d_{Oi}) \qquad (1B)$$

where $N_G$ and $N_O$ are the positive programming parameters of the probability, $\varphi(\ )$ is the kernel density function, $d_{Gi}$ is a training sample of the "ground" training data, $T_n$ is the total training samples of this type, $d_{Oi}$ is a training sample of the "other" training data, $T_m$ is the total training samples of this type.

The training the probability distribution $p(d|h=C)$ of the "car" color model is as follows. A large number of car training samples are collected to train the color model, and these cooler training samples are transformed to different color space with the following equation:

$$Z=(R+G+B)/3$$

$$u=(2Z-G-B)/Z$$

$$p=\text{Max}\{(Z-G)/Z,(Z-B)/Z\} \qquad (2)$$

The light change problem may be overcome by only considering information (u,p) with hue in the new color space. The large number of car color training samples, after transformed to the new color space, will concentrate at some part of the u-p space. This concentration distribution may be approximated by Gaussian model, as follows:

$$p(x \mid \text{vehicle}) = \frac{1}{2\pi\sqrt{|\Sigma_v|}} \exp\left(-\frac{1}{2}(x - m_v)\Sigma_v^{-1}(x - m_v)^T\right) \qquad (3)$$

In the above equation, $x=(u,p)$, $m_V$ is the average vector of the hue information, and $\Sigma_V$ is the covariance matrix of the hue information. If $x=T(d)$ is defined to represent the color transformation equation of equation (2), the "car" color model may be described by the following equation:

$$p(d \mid h = C) \equiv \frac{1}{N_C} p(T(d) \mid \text{vehicle}) \qquad (4)$$

where $N_C$ is the positive programming parameter of the probability.

Figure 5:
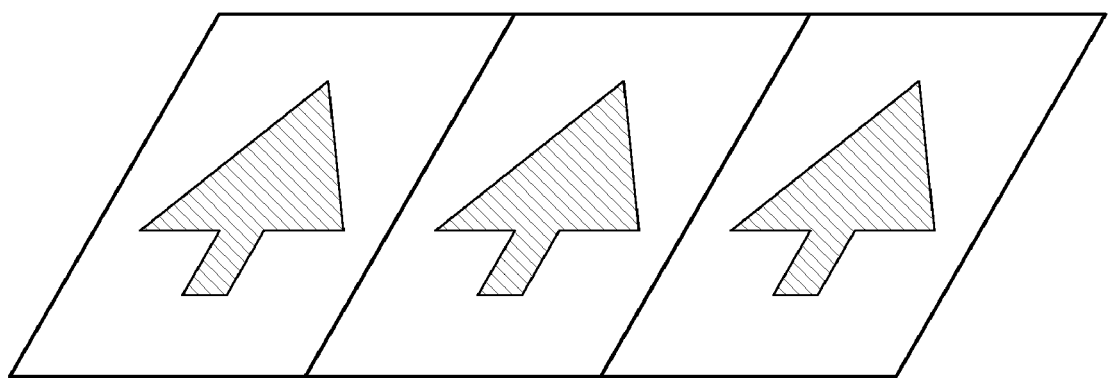
FIG. 5 shows an exemplary schematic view of adding special device or labeling to parking space, consistent with certain disclosed embodiments of the present invention.

The following example may further identify parking space more easily, for example, by adding special device, such as special color ground labeling, special shape ground labeling, lighting device with special frequency or color, or arranged special pattern, to the parking space. FIG. 5 shows an example where a large arrow mark is added to the parking space as the special device. In this manner, labeling nodes $h_1$-$h_M$ may add another classification of "special labeling" K. Therefore, the probability distribution of the local special labeling K in the above equation (1A)-(1B) is as follows:

$$p(d \mid h = K) = \frac{1}{N_K} \sum_{i=1}^{T_p} \varphi(d - d_{Ki}) \qquad (1C)$$

where $N_k$ is the positive programming parameter, $d_{Ki}$ is the feature of the special labeling training sample, and $T_P$ is the total number of the training samples of this type.

The large number of training samples of special labeling collected in local classification model M1 may be trained by equation (1A) to obtain the probability distribution of each pixel belonging to the special labeling. Therefore, local classification model M1 may use only two types of classification labeling pixels. One is the "special labeling" pixel and the other is the "non-special labeling" pixel. The probability distribution may refer to equations (1A)-(1C). The 3-layer detection mechanism may be established by training the probability distribution of the two labeling features.

(2) Adjacent local constraint model M2 learns the constraint of the adjacent labeling nodes of classification nodes $h_1$-$h_M$ in advance from the training set. Joint probability p($h_i$, $h_j$) of the status of two adjacent labeling nodes $h_i$, $h_j$ is the probability distribution of the adjacent local constraint.

(3) Global semantics model M3 provides global semantics with the prior knowledge of labeling constraint information. Take the space detection in a parking lot as an example. The labeling constraint information may imply the 3-D projection information and predictable occlusion information. To describe the prior knowledge of global semantics constraint, a probability p($h_i$|$R_s$($h_i$)) may be established for each pixel i, where p($h_i$|$R_s$($h_i$)) is the status probability of labeling $h_i$ for pixel i under the condition $R_s$($h_i$), and $R_s$($h_i$) is the parking space status set related to $h_i$. Probability p($h_i$|$R_s$($h_i$)) may be approximated by the generated statistics through accumulating many known correct labeling samples. The correct labeling samples may be the ground truth obtained through the manual classification labeling of the parking lot test image, or the automatically generated virtual training labeling samples to improve the training efficiency.

To generate virtual training labeling samples, some basic assumptions are made. Take the space detection in a parking lot as an example. Assume that a 3-D cube is sued to represent a car. The length, width and height of the cube are defined as three mutually independent Gaussian random numbers. The averages and variances of these three random numbers are determined through experiments. Also assume that the status of each parking space follows the uniform distribution random number, and the status of each parking space is independent. The location (x,y) of a car parked in a paring space is also random, and the two coordinates x, y are also independent Gaussian random numbers. Therefore, according to the above assumption and the projection parameter of the camera, the virtual training labeling samples may be randomly generated.

If the special device or labeling is added on the parking space, such as shown in FIG. 5, the training process of global semantics information model M3 will learn the shape of the global special labeling or the global feature information, and may remember the trained probability distribution in global semantics information model M3.

Figure 6A:
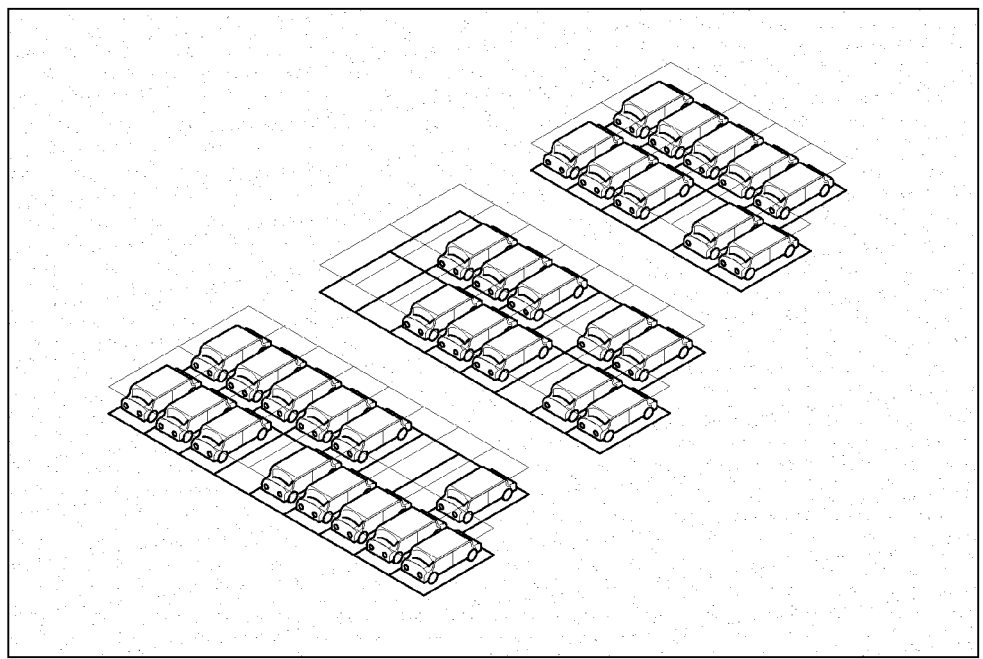
FIG. 6A shows a schematic view of a virtual training sample for training global semantics prior knowledge, consistent with certain disclosed embodiments of the present invention.
Figure 6B:
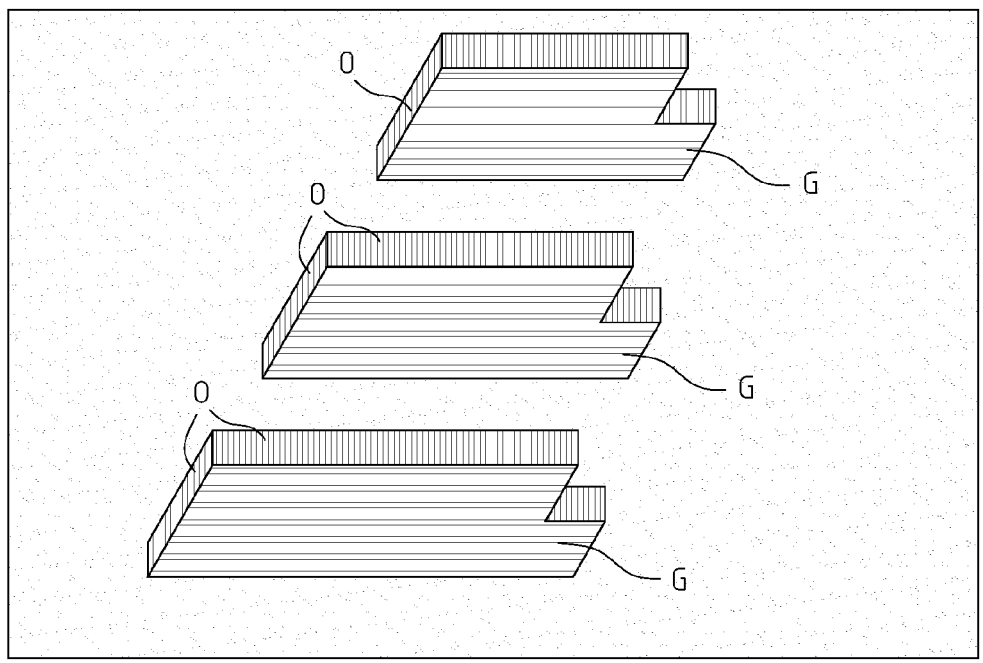
FIG. 6B shows an exemplary schematic view of further labeling "ground" and "others" of FIG. 6A, consistent with certain disclosed embodiments of the present invention.

Take the space detection for a parking lot as an example. FIG. 6A shows a schematic view of an exemplary virtual training sample for training the global semantics prior knowledge. Referring to FIG. 6A, the car area represents the "car" classification labeling, and the dotted area may represent the "ground" classification labeling or the "other" classification labeling. FIG. 6B shows a schematic view of further marking the "ground" and "other" classification labeling of FIG. 6A, consistent with certain disclosed embodiments of the present invention.

Referring to FIG. 6B, the pre-defined "ground" labeling area G is the double-slash pattern, and the "other" labeling area O is the single slash pattern. The dotted image areas are the areas not to be processed, and these areas do not affect the space detection of the parking space. The exemplary embodiments of the disclosed uses, say 500 images, as the training labeling samples to train the global semantics prior knowledge p($h_i$|$R_s$($h_i$)). A minimum probability constraint may also be given to p($h_i$=C|$R_s$($h_i$)), p($h_i$=G|$R_s$($h_i$)), p($h_i$=O|$R_s$($h_i$)) in advance to prevent from over-training resulting in generating zero probability.

Figure 7:
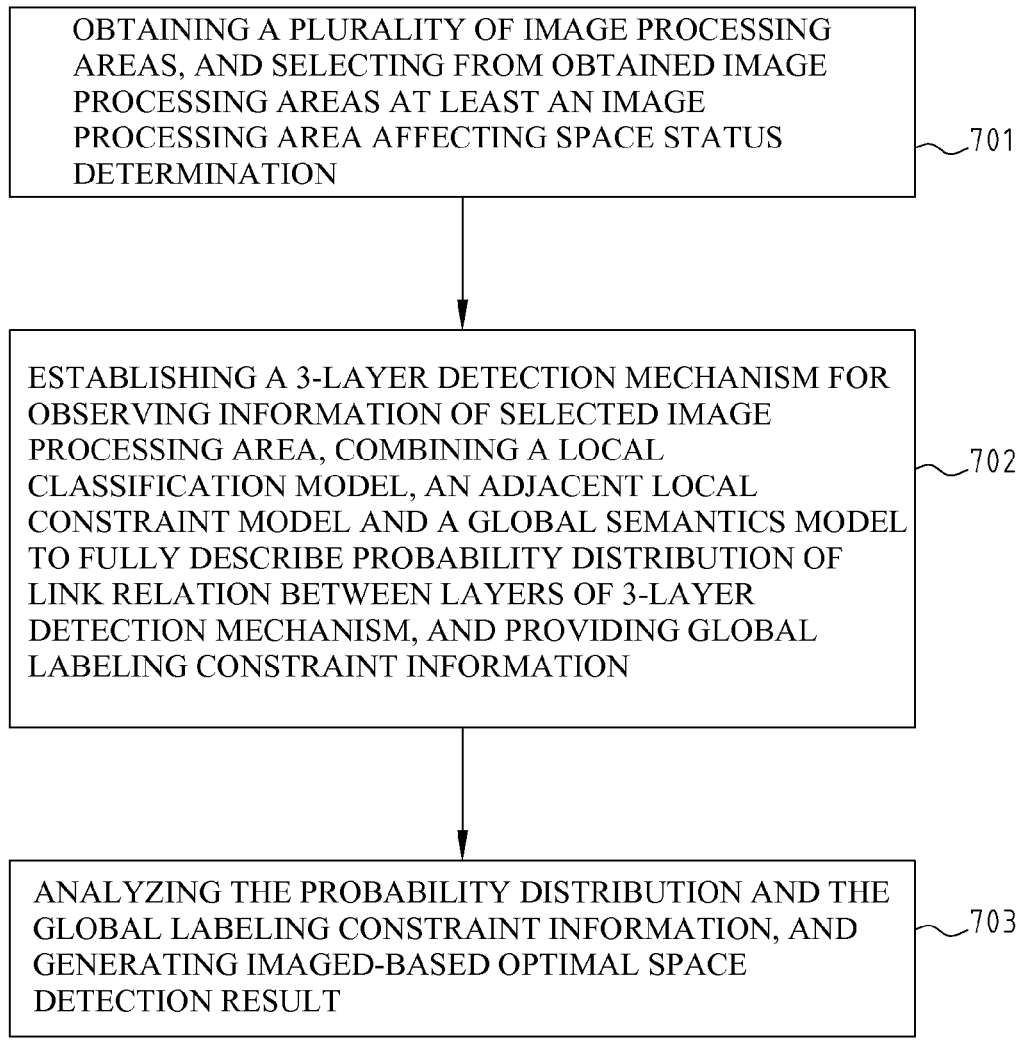
FIG. 7 shows a schematic view of an exemplary flowchart of the operation of image-based space detection, consistent with certain disclosed embodiments of the present invention.

FIG. 7 shows a schematic view of an exemplary flowchart of the operation of the aforementioned image-based space detection system, consistent with certain disclosed embodiments. Referring to FIG. 7, image selecting module 101 may capture a plurality of image processing areas and select from the captured images at least an image area that will affect the space status determination, as shown in step 701. In step 702, for the constructed 3-layer detection mechanism 103 may observe the selected image area information, combine local classification mode M1, adjacent local constraint model M2 and global semantics information model M3 to fully describe the probability distribution of the link relation between the layers (observation layer, labeling layer and semantics layer). In step 703, optimization module 105 may analyze the probability distribution and the global semantics constraint information and generate image-based optimal space detection result.

The link relation between the layers of 3-layer detection mechanism 103, the probability distribution, and models M1-M3 are the same as earlier description, and thus omitted here. The following uses the space detection in a parking lot as an example to describe the image classification division process and the optimization inference method of space detection for the parking lot space.

Figure 8A:
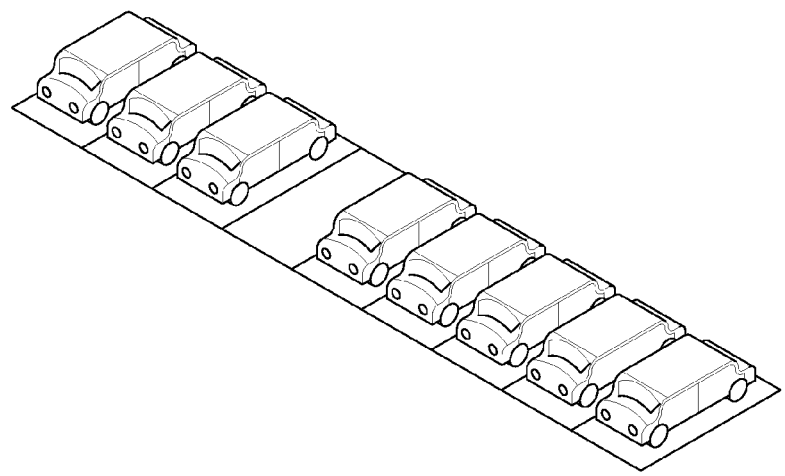
FIG. 8A shows an exemplary schematic view of obtaining image processing area from parking lot, consistent with certain disclosed embodiments of the present invention.

FIG. 8A shows an exemplary schematic view of obtaining image processing areas in a parking lot. In this example, image selection module 101 may obtain the image area occupied by the parking spaces for the image processing area from an entire row of parking spaces. The obtaining of image processing area may assume that each parking space is a cube with height of 1.3 m, length and width the same as the lines outlining the parking space in the 3-D scene. Through camera calibration, the projection matrix from the 3-D to the image plane may be obtained and the image processing area may be selected by projecting all the cubes in the 3-D scene to the image plane.

Figure 8B:
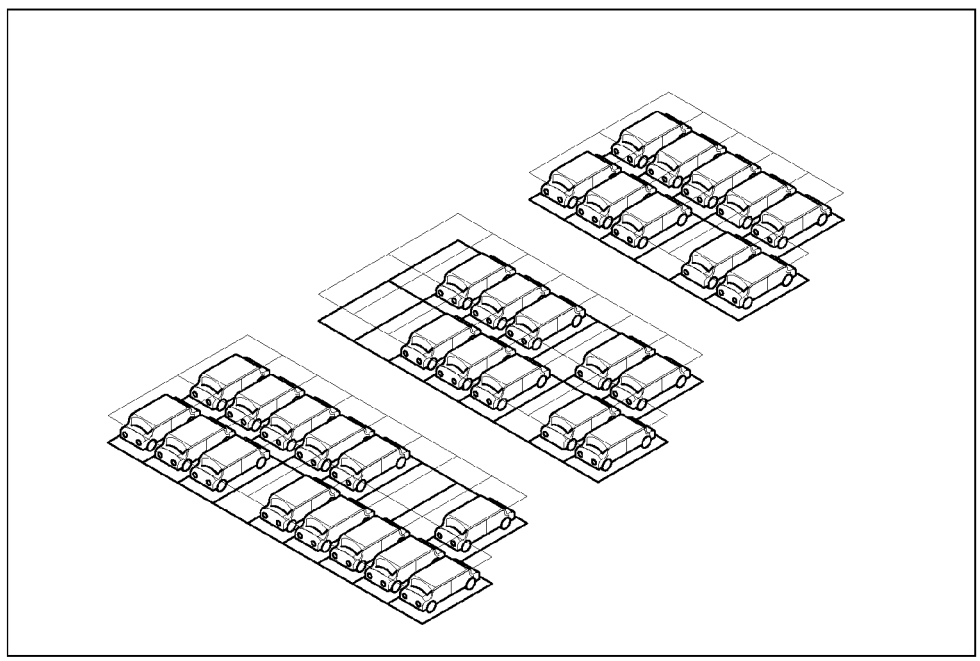
FIG. 8B shows a schematic view of an exemplary image processing area and a corresponding parking space area in a 3-D scene, consistent with certain disclosed embodiments of the present invention.

FIG. 8B shows 6 exemplary image processing areas mapping to 6 rows of parking space areas in the 3-D scene respectively. Inputting the 6 image processing areas to 3-layer detection mechanism 103 for analysis, optimization module 105 may determine the status of each row and generate the optimal image labeling.

For each image processing area, 3-layer detection mechanism 103 may find the reasonable semantics state $S_L$ of the parking status and the optimal image labeling $H_L$ according to the current observed image information $D_L$, where the feature node set of image observation layer 203a is $D_L = \{d_1, \ldots, d_M\}$, the labeling node set of hidden labeling layer 203b is $H_L\{h_1, \ldots, h_M\}$, and the semantics node set of object semantics layer 203c is $S_L = \{s_1, \ldots, s_N\}$.

Each node $d_i$ of the feature node set of image observation layer 203a may represent the RGB color feature of the i-th pixel in the image processing area, and M is the total number of the pixels in the current image processing area. Each node $h_i \in \{C,G,O\}$ of the labeling node set of hidden labeling layer 203b may represent the local labeling of the i-th pixel in the image processing area. The local labeling may be "C" pixel for "car", "G" pixel for "ground", or "O" pixel for "others". Each node $s_i \in \{0,1\}$ of the semantics node set of object semantics layer 203c may represent the status "0" (vacant) or "1" (occupied) of the i-th parking space, and N is the total number of the parking spaces in the current image processing area under processing.

According to the above definition, the most suitable graphic model of 3-layer detection mechanism may be trained. The graphic model may fully describe the related statistic relation in the detection mechanism, and output the link relation probability distribution between layers to optimization module 105. Therefore, the image labeling problem $p(H_L|D_L)$ and detection problem $p(S_L|D_L)$ may be combined into a combined inference problem $p(H_L, S_L|D_L)$.

According to the link probability distribution between layers of 3-layer detection mechanism 103, optimization module 105 uses the global optimization or local optimization to obtain the optimal parking space status, including, such as number of vacant spaces, locations of the vacancy, and the image labeling of the parked cars, and so on. Based on observation information $D_L$, optimization module 105 may find most suitable classification labeling $H_L$ and optimal semantics inference $S_L$, and describe the problem as an optimization map problem, defined as equation (5) below.

$$H_L^*, S_L^* = \underset{H_L, S_L}{\arg\max}\, p(D_L | H_L, S_L) \quad (5)$$
$$= \underset{H_L, S_L}{\arg\max}\, p(D_L | H_L, S_L) p(H_L | S_L) p(S_L)$$
$$= \underset{H_L, S_L}{\arg\max}\, [\ln(p(D_L | H_L)) + \ln(p(H_L | S_L)) + \ln(p(S_L))]$$
$$= \arg\max\left[\left[\sum_i \ln(p(d_i | h_i))\right] + \ln(p(H_L | S_L)) + \ln(p(S_L))\right]$$

where observation information $D_L$ and optimal semantics inference $S_L$ are mutually independent. Observation feature node $d_i$ located in area i may be assumed to be related only with its corresponding hidden labeling node $h_i$, as shown in FIG. 2. $(H^*_L, S^*_L)$ of equation (5) represents the image-based optimal space detection result generated by optimization module 105.

The following uses an example to describe how optimization module 105 generates the optimal space detection result. Assume that different parking space statuses are statistically independent. Therefore, in graphic model, there is no link between different semantics nodes $(S_1\text{-}S_N)$ of the semantics layer (seeing FIG. 2). The following equation may represent the parking space status probability:

$$\ln(p(S_L)) = \sum_{i=1}^N \ln(p(s_i)) \quad (6)$$

where $p(s_i)$ is uniformly distributed. In other words, for each parking space status, the probabilities of being vacant and being occupied are equal.

Figure 9A:
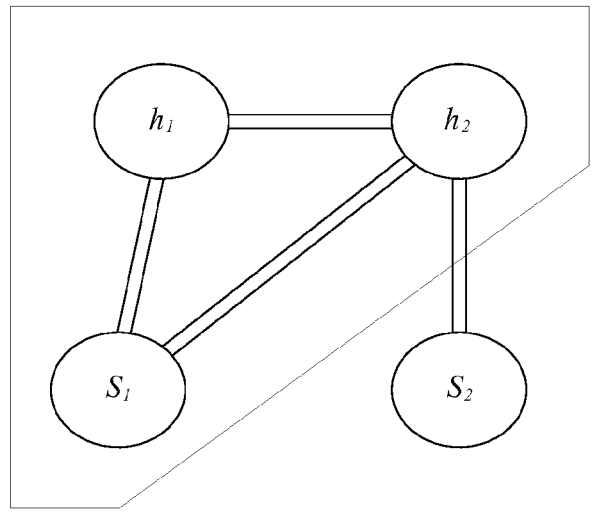
FIG. 9A shows a schematic view of forming loops between hidden labeling layer and object semantics layer, consistent with certain disclosed embodiments of the present invention.

From the graphic model of trained 3-layer detection mechanism 103, there are many loops formed by three nodes between hidden labeling layer 203b and object semantics layer 203c. These loops will complicate the optimization process. The cutset conditioning technique may effectively handle the problem and break the loops because this technique can be used to break the known status nodes into a plurality of identical nodes. FIG. 9A shows an exemplary schematic view of forming a loop between hidden labeling layer and object semantics layer. Referring to FIG. 9A, two labeling nodes $(h_1, h_2)$ and a semantics node $S_1$ form a loop. If the statuses of all nodes in the object semantics layer are given, this means that all the loops may be broken by breaking the semantics node.

Figure 9B:
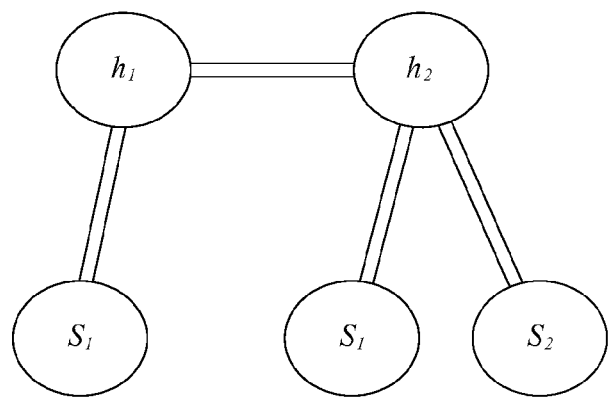
FIG. 9B shows an exemplary schematic view of using cutset conditioning technique to break loops, consistent with certain disclosed embodiments of the present invention.

FIG. 9B shows an exemplary schematic view of breaking loops with cutset conditioning technique. Referring to FIG. 9B, if the statuses of semantics nodes $S_1$ and $S_2$ are known in advance, with cutset conditioning technique, the loops in FIG. 9A may be broken and semantics node $S_1$ can be duplicated as two nodes with the same status.

After graphic model training and cutset conditioning technique, conditional probability $p(H_L|S_L)$ equation (5) may be further factored by the statistic pattern hidden in the graphic model. In the new graphic model, the link relation between object semantics layer 203c and hidden labeling layer 203b does not include any loop, and the link relation between object semantics layer 203c and hidden labeling layer 203b may be described with the statistic characteristic of two major factors, $p(h_i|R_s(h_i))$ and $p(h_i, h_j)$, where $p(h_i|R_s(h_i))$ is the status probability of labeling $h_i$ for pixel i under the condition of given $R_s(h_i)$ status, and $R_s(h_i)$ is the parking space status set related to $h_i$.

In the example of FIG. 9B, using labeling node $h_2$ as an example, the related parking space status set is $R_s(h_2)=\{s_1, s_2\}$. $p(h_i, h_j)$ is the joint probability of two adjacent labeling nodes statuses. Therefore, probability $p(H_L|S_L)$ may be further expressed as:

$$\ln(p(H_L | S_L)) = \sum_{i \in M} \ln(p(h_i | R_S(h_i))) + \sum_{i \in M} \sum_{j \in N_i} \ln(p(h_i, h_j)) \quad (7)$$

where M is all the pixels in the current image processing area, and $N_i$ is the pixel set adjacent to pixel i.

$p(h_i, h_j)$ of equation (7) may be approximated by following equation (8):

$$p(h_i, h_j) \propto \exp\{-V_{(i,j)}(h_i, h_j)\} \quad (8)$$

where $V_{(i,j)}(h_i, h_j) \equiv \beta \times G_S(\|d_i - d_j\|) \times (1 - \delta(h_i, h_j))$. $V_{(i,j)}(h_i, h_j)$ represents the constraint relation between classification labeling node $h_i$ and classification labeling node $h_j$, and $G_s(.)$ is a Gaussian equation with average zero. The standard deviation of the Gaussian equation may be determined by the prior experiments. $\beta$ in the equation may indicate a penalty parameter, $d_i$ and $d_j$ are the color features of pixel i and pixel j, respectively, and $\delta(.)$ is the common mathematic Dirac's delta equation.

Basically, $V_{(i,j)}(h_i, h_j)$ presents the following message of physics: when two adjacent classification labeling nodes $h_i$ and $h_j$ have different outcomes, the system will assign a penalty. Therefore, according to equations (6), (7), equation (5) may be further rewritten as the following equation (9):

$$H_L^*, S_L^* = \underset{H_L, S_L}{\arg\max}\left[\sum_{i \in M} \ln(p(d_i | h_i)) + \ln(p(H_L | S_L))\right] \quad (9)$$
$$= \underset{S_L}{\arg\max}\underset{H_L}{\max}\left[\begin{array}{l}\sum_{i \in M} \ln p(d_i | h_i) + \ln p(h_i | R_S(h_i)) + \\ \sum_{i \in M}\sum_{j \in N_i} p(h_i, h_j)\end{array}\right]$$

where the influence of $\ln(p(S_L))$ of equation (5) is omitted because of the uniform distribution assumption in equation (6).

The optimal solution of equation (9) may be obtained by the following approach. Assume that status $S_L$ the entire object semantics layer is a randomly selected combination $S_L^c$. Therefore, given $S_L$ that is known, the aforementioned custset conditioning technique may be used to break all the loops. Then, the next step is to find the optimal labeling status $H_L^c$ under the condition that semantics layer status $S_L$ is set as $S_L^c$. Basically, this may be viewed as an optimization MAP-MRF problem if the likelihood energy term and the prior energy term of the MAP-MRF are set as $$\sum_{i \in M} \ln(p(d_i \mid h_i)) + \ln(p(h_i \mid R_S(h_i))) \text{ and } \sum_{i \in M} \sum_{j \in N_i} \ln(p(h_i, h_j)),$$

respectively.

Then, the graph cuts method may be used to solve the above optimization MAP-MRF problem and obtain optimal labeling status $H_L^c$ under the condition that semantics layer status $S_L$ is set as $S_L^c$. At this point, a price value representing the solution pair $(S_L^c, H_L^c)$ may also be obtained. The price value means the credibility that the solution pair can be used as the final solution. The price value of the solution pair may also be stored in a table.

To find the final most reasonable result $(S_L^c, H_L^c)$, the most direct approach is to try all the possible settings for semantics layer status $S_L$ to obtain the price values for all solution pairs, and then select the optimal solution pair by comparing the price value. Assume that the current image processing area includes N parking spaces, the number of possible status combinations of hidden semantics layer status $S_L$ is $2^N$. Therefore, it takes $2^N$ MAP-MRF processes to find the price value for all the solution pairs. This direct approach is inefficient and the computation complexity grows exponentially as the number of parking spaces N grows. Through the statistic relation between object semantics layer 203c and hidden labeling layer 203b of the present invention, the inference processes is accelerated. By factoring the max operation on $S_L$ in the original equation into a plurality of max operations on each semantics node $s_i$, and switching the multiplication operator and the max operator (refer to equation (13)), the optimal status of each semantics node $s_i$ may be determined one by one.

Take the process of obtaining the optimal parking space status $s_1$ as an example. $S_L$ is first divided into two non-overlapping groups, $CS(s_1)$ and $OS(s_1)$, where $CS(s_1)$ is the set of all the semantics nodes of $S_L$ related to $s_1$, and $OS(s_1)$ is the set of the other semantics nodes. The precise definition for $CS(s_1)$ is as follows: for a labeling node $h_i$ in set $H_L$, if parking space status set $R_s(h_i)$ related to labeling node $h_i$ includes $s_1$, parking space status set $R_S(h_i)$ is taken into consideration, and the union of all the parking space status sets of this type forms $CS(s_1)$. According to the above, $CS(s_1) \equiv \{R_S(h_i) \mid s_1 \in R_S(h_i), i=1 \ldots M\}$ may be precisely defined. From this definition, it can be seen that any semantics node $s_i$ in set $CS(s_1)$ is either $s_1$ itself or linking to $s_1$ through a labeling node in the graphic model.

To simplify the following derivation, the following mathematic items are defined in advance:

$$\ln(F_{D,H}) \equiv \ln(F(D_L, H_L)) \equiv \sum_{i \in M} \ln(p(d_i \mid h_j)), \quad (10)$$

$$\ln(F_{H_A, CS(s_1)}) + \ln(F_{H_B, OS(s_1)}) \equiv \quad (11)$$
$$\ln(F(H_A, CS(s_1))) + \ln(F(H_B, OS(s_1))) \equiv$$
$$\sum_{h_i \in H_A} \ln(p(h_i \mid R_S(h_i))) + \sum_{h_i \in H_B} \ln(p(h_i \mid R_S(h_i))) =$$
$$\sum_{i \in M} \ln(p(h_i \mid R_S(h_i)))$$

$$\ln(F_H) \equiv \ln(F(H_L)) \equiv \sum_{i \in M} \sum_{j \in N_i} \ln(p(h_i, h_j)) \quad (12)$$

According to equations (10), (11), (12), and the aforementioned acceleration technique, equation (9) may be rewritten as equation (13):

$$\operatorname*{arg\,max}_{OS(s_1)} \max_{CS(s_1)} \max_{H_L} \left[ \begin{array}{l} \ln(F_{D,H}) + \ln(F_{H_A, CS(s_1)}) + \\ \ln(F_{H_B, OS(s_1)}) + \ln(F_H) \end{array} \right] = \quad (13)$$
$$\operatorname*{arg\,max}_{OS(s_1)} \max_{H_L} \left[ F_{D,H} F_{H_B, OS(s_1)} F_H \left[ \max_{CS(s_1)} F_{H_A, CS(s_1)} \right] \right]$$

where $OS(s_1)$ may be viewed as a constant during solving the optimal status of semantics node $s_1$. Therefore, to determine the optimal status of $s_1$, it is only necessary to find the optimal solution in the solution space of $(H_L, CS(s_1))$. For example, if $s_1$ is only related to $s_2$, it means $CS(s_1) = \{s_1, s_2\}$. As each semantics node has two possible status, it only requires $2^2 = 4$ MAP-MRF processes to determine the optimal status of $s_1$.

In actual applications, in average, each parking space is related to the adjacent two parking spaces. To infer the status of N parking spaces in an image processing area, the average number of MAP-MRF is $2^3 \times N$. In comparison with the previous direct approach, the current approach may effectively reduce the computation complexity to linear growth with N. Also, some MAP-MRF processes may be repeated, the repetition may be saved if the execution results are stored.

Figure 10:
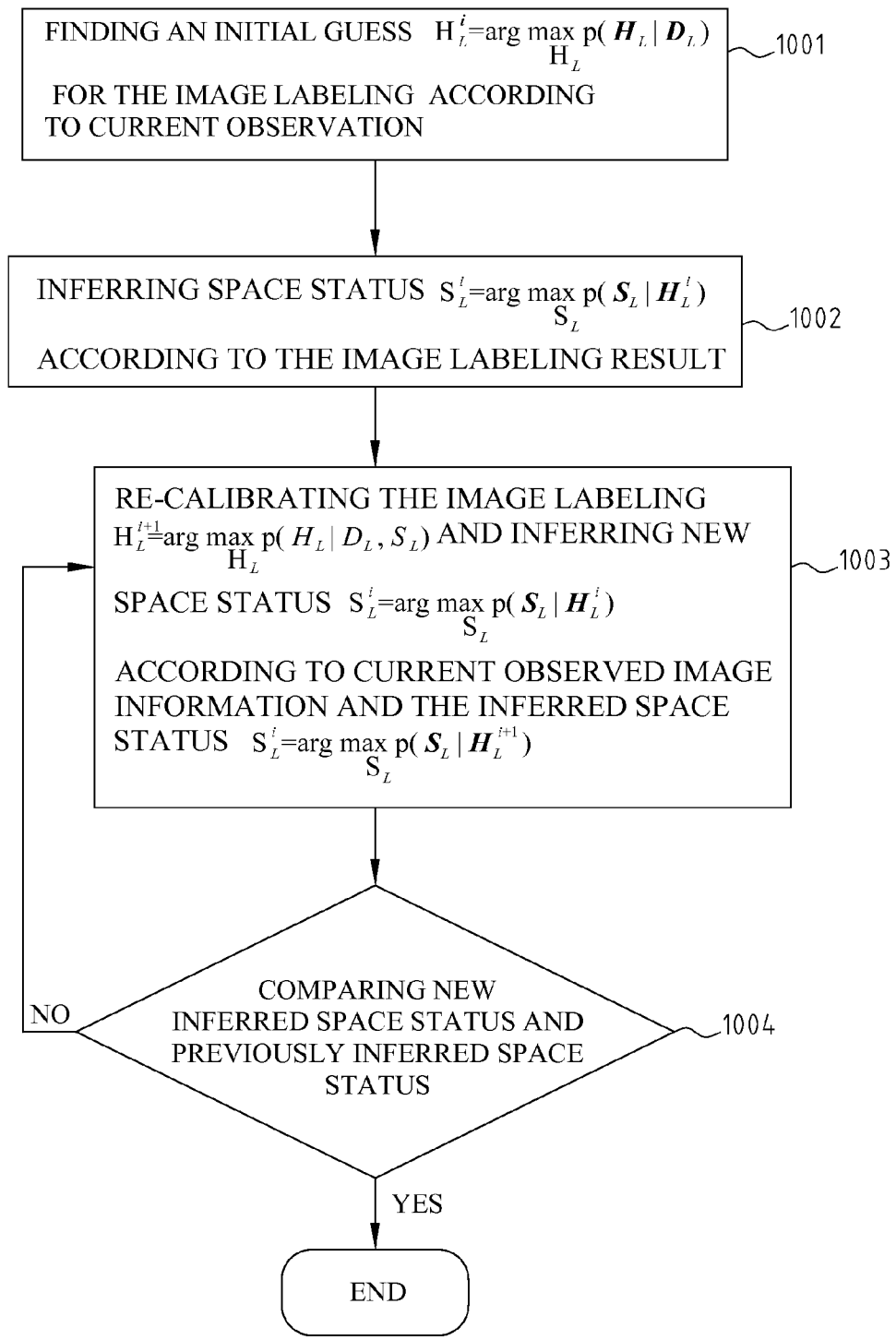
FIG. 10 shows an exemplary flowchart of executing the local optimization method, consistent with certain disclosed embodiments of the present invention.

The above describes the global optimization method. The following describes the local optimization method. Similarly, the local optimization method may also accelerate the inference process. The result of the local optimization is usually highly related to the initial guess. If the initial guess is incorrect, the final result may also be incorrect. FIG. 10 shows a schematic view of an exemplary flowchart of executing the local optimization method, consistent with certain disclosed embodiments of the present invention.

Referring to FIG. 10, in step 1001, it may use methods, such as MAP-MRF, to find an initial guess $$H_L^i = \operatorname*{argmax}_{H_L} p(H_L \mid D_L)$$

for the image labeling according to the current observation. According to the image labeling result, it may infer the parking space status $$S_L^i = \operatorname*{argmax}_{S_L} p(S_L \mid H_L^i),$$

as shown in step 1002. According to the current observed image information and the inferred parking space status $$S_L^i = \operatorname*{argmax}_{S_L} p(S_L \mid H_L^i),$$

it may re-calibrate image label $$H_L^{i+1} = \operatorname*{argmax}_{H_L} p(H_L \mid D_L, S_L^i),$$

and infer to obtain new parking space status $$S_L^{i+1} = \operatorname*{argmax}_{S_L} p(S_L \mid H_L^{i+1}),$$

as shown in step 1003. In step 1004, it may determine whether new parking space status $S_L^{i+1}$ is the same as the previous parking space status $S_L^i$. If so, the inference process stops; otherwise, return to step 1003.

In the image-based space detection, if special device or labeling is added to the space, the process speed and the correctness of the subsequent image capturing and tracking may be effectively improved. In the training process of global semantics information model M3, the shape of the special labeling or the global feature information may be learned, and remembered in the probability distribution trained by global semantics information model M3.

Take space detection in a parking lot as example. The special device or labeling, such as visible pattern and strong color contrast marks or even directional marks may be painted to the parking space to assist in efficient and correctness of space detection in a parking lot. The aforementioned FIG. 5 is one of the special types of labeling. FIGS. 11A-11D shows an exemplary plurality of special devices or types of labeling. FIG. 11A shows a ground labeling of a special color. FIG. 11B shows a ground labeling of a special shape. FIG. 11C shows a twinkling lighting device of special frequency or color. FIG. 11D shows an arranged special pattern.

Figure 12:
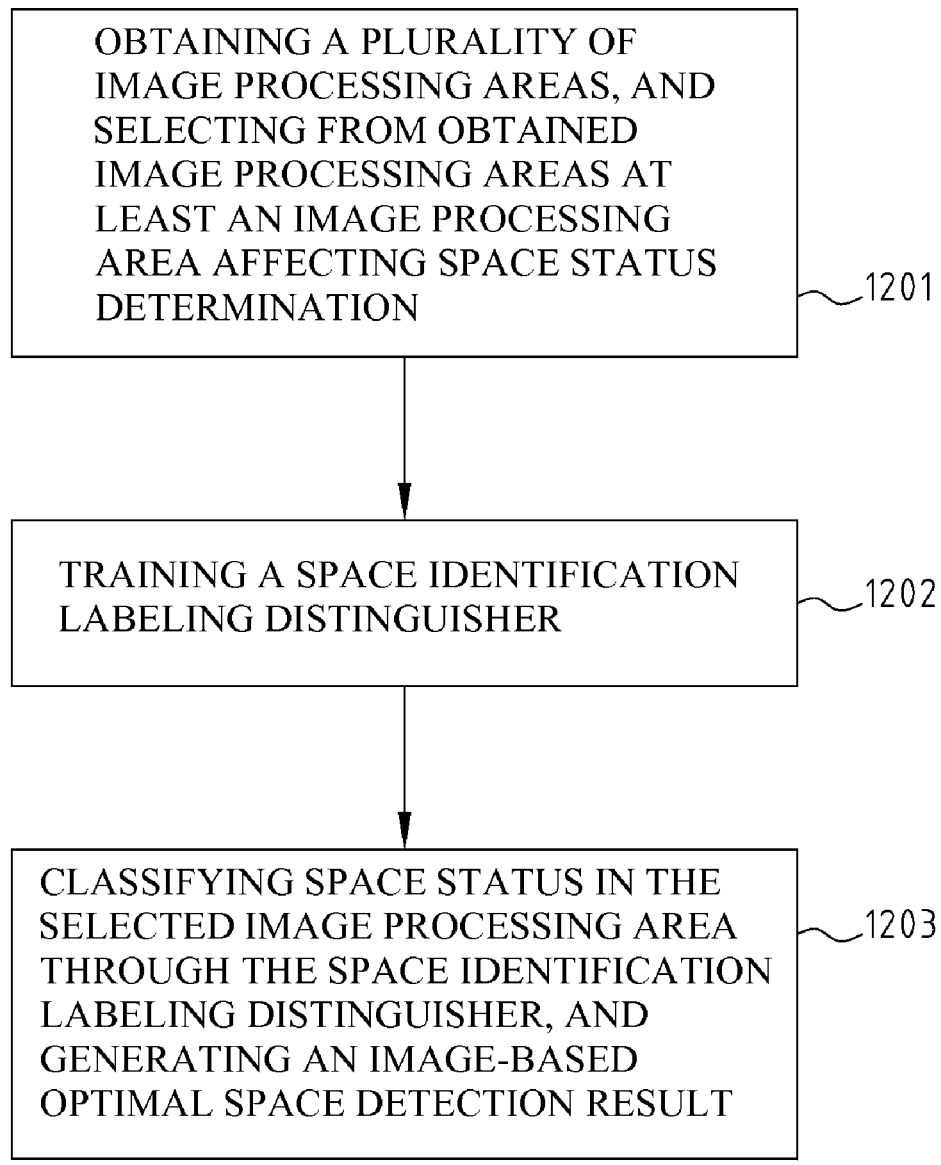
FIG. 12 shows an exemplary flowchart of an image-based space detection method, consistent with certain disclosed embodiments of the present invention.

FIG. 12 shows another exemplary flowchart of executing image-based space detection method. In the exemplary flowchart of FIG. 12, a special device or labeling added to the space is included in consideration for space detection. As shown in step 1201, image selection model may capture a plurality of image processing areas and select at least an image processing area from the captured images. In selecting image processing areas, the camera calibration parameters may be used to understand the transformation relation between 3-D space and the image, and based on this information to distinguish the image range occupied by different parking spaces.

Because special device or labeling has a unique feature, the unique feature may be used to differentiate the occupant (car) and the special device or labeling. Therefore, for each independent space image area, if the special device or labeling may be detected, the space may be determined to be available.

In step 1202, it is to train a space identification labeling distinguisher, such as a classifier able to detect the special device or labeling. There are many ways to train the special device classifier, such as Adaboosting algorithm, neural network algorithm, linear discriminant analysis (LDA), and support vector machine (SVM) algorithm.

Take the Adaboosting algorithm as example. In training stage, the space images having special device or labeling are collected as the positive training patterns. Occupied space images are collected as the negative training patterns. Unit classifiers are established by using haar-like features. Then, it selects and combines a plurality of unit classifiers able to distinguish as the space identification labeling distinguisher.

In step 1203, it classifies the space status in the selected image processing area through the space identification labeling distinguisher to generate the image-based optimal space detection result, such as the space status, location of vacancy and the number of vacancies.

Therefore, in the parking lot example, if a special device or labeling is added to each parking space, the space detection system may include image selection module 101 and the space identification labeling distinguisher, where image selection module 101 captures a plurality of image processing areas and selects at least an image processing area from the captured images, and the space identification labeling distinguisher classifies the space status in the selected image processing area and generates the image-based optimal space detection result. The space identification labeling distinguisher may be trained to become a classifier able to differentiate each corresponding special device or labeling.

The image-based space detection method and system of the present invention may detect the space status of the image processing area and solve the space identification problem caused by light change or object occlusion. Through the optimization module, the optimal space detection result may be generated. When applied to space detection in a parking lot, the present invention may also use the optimization module to provide the optimal vacancy status, such as number of vacancies, locations of vacancies, and occupied image labeling, as well as labeling the car parking on the space.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An image-based space detection system, comprising:
an image capturing and processing device for capturing and processing images of a plurality of image processing areas and selecting from said captured image processing areas at least an image processing area affecting space status determination;
a 3-layer detection mechanism having an observation layer, a labeling layer and a semantics layer, said 3-layer detection mechanism being coupled to said image capturing and processing device, observing information of said selected image processing areas, combining a local classification model, an adjacent local constraint model and a global semantics model to fully describe probability distribution of link relation between layers of said observation layer, said labeling layer and said semantic layer, and providing global labeling constraint information; and
a computing device connected to said 3-layer detection mechanism, for analyzing said probability distribution and said global labeling constraint information, and generating image-based optimal space detection result.

2. The system as claimed in claim 1, wherein said observation layer is an image observation layer, said labeling layer is a hidden labeling layer, and said semantics layer is an object semantics layer.

3. The system as claimed in claim 2, wherein each node in said image observation layer represents a local feature of an area.

4. The system as claimed in claim 2, wherein said each node in said hidden labeling layer represents classification labeling status of an area or a pixel.

5. The system as claimed in claim 2, wherein said each node in said object semantics layer comprises all the assumed statuses that said system is expected to derive.

6. The system as claimed in claim 2, wherein said link relation between said image observation layer and said hidden labeling layer is established through said local classification model.

7. The system as claimed in claim 2, wherein said link relation between nodes in said hidden labeling layer is established through said adjacent local constraint model.

8. The system as claimed in claim 2, wherein said link relation between said object semantics layer and said hidden labeling layer is established through said global semantics model.

9. The system as claimed in claim 2, wherein said local classification model classifies information of said selected at least an image processing area into different types of labeling.

10. The system as claimed in claim 1, wherein said local classification model, said adjacent local constraint model and said global semantics model are all pre-trained models.

11. The system as claimed in claim 1, wherein said local classification model, said adjacent local constraint model and said global semantics model are models that are based on pre-trained model and updated online according to detection result.

12. The system as claimed in claim 1, wherein said optimal space detection result is the space status, vacancy location, the number of vacancies, or any combination of the above.

13. The system as claimed in claim 1, wherein said global semantics model provides labeling constraint information of global semantics prior knowledge, and said labeling constraint information is hidden 3-D projection information, predictable occlusion information, or any combination of the above.

14. The system as claimed in claim 12, wherein all said parking spaces may be with a labeling, without any labeling, or some having labeling and some having not labeling.

15. The system as claimed in claim 1, wherein said system is a space detection system for parking lot.

16. The system as claimed in claim 15, wherein each classification labeling node of said hidden labeling layer represents one of a "car" classification labeling, a "ground" classification labeling, a "special labeling" classification labeling", or an "other" classification labeling.

17. The system as claimed in claim 10, wherein said adjacent local constraint model learns from a training set constraint relation between adjacent labeling nodes in classification adjacent nodes.

18. An image-based space detection method, comprising the steps of:
    obtaining a plurality of image processing areas, and selecting from said obtained image processing areas at least an image processing area affecting space status determination by using an image capturing and processing device to capture and processing images of the plurality of image processing area;
    establishing a 3-layer detection mechanism for observing information of said selected image processing area, combining a local classification model, an adjacent local constraint model and a global semantics model to fully describe probability distribution of link relation between layers of said 3-layer detection mechanism, and providing global labeling constraint information; and
    analyzing said probability distribution and said global labeling constraint information, and generating image-based optimal space detection result by using a computing device.

19. The method as claimed in claim 18, wherein said optimal space detection result is obtained through an optimization inference method.

20. The method as claimed in claim 18, wherein said 3-layer detection mechanism is established as a 3-layer detection mechanism having an image observation layer, a hidden labeling layer and an object semantics layer.

21. The method as claimed in claim 18, said method further includes training a graphic model most suitable for said 3-layer detection mechanism, and said graphic model filly describes related statistics feature in said 3-layer detection mechanism and generates probability distribution of link relation between said layers.

22. The method as claimed in claim 19, wherein said optimization inference method accelerates inference process through the statistics relation between said object semantics layer and said hidden labeling layer.

23. The method as claimed in claim 19, wherein said optimization inference method finds the most suitable classification labeling and the optimal semantics inference according to observation information, and describes as an optimization mapping problem for solving.

24. The method as claimed in claim 19, wherein said optimization inference method is a local optimization method, and said local optimization method further includes:
    finding an initial guess of image labeling according to current observation;
    inferring space status according to said image labeling result;
    re-calibrating said image labeling and inferring new space status according to current observed image information and said inferred space status; and
    comparing new inferred space status and previously inferred space status, if the same, ending said inference process; otherwise, returning to the step of re-calibrating said image labeling and inferring new space status.

* * * * *